United States Patent Office 2,821,524
Patented Jan. 28, 1958

2,821,524

AZO DYESTUFFS OF THE PYRAZOLONE SERIES

Piero Maderni, Hans Ruckstuhl, and Willy Steinemann, Basel, Switzerland, assignors, by mesne assignments, to Saul & Co., Newark, N. J., as nominee of Fidelity Union Trust Company, executive trustee under Sandoz Trust No Drawing. Application March 29, 1954
Serial No. 419,608

Claims priority, application Switzerland April 2, 1953

6 Claims. (Cl. 260—147)

The present invention relates to new azo dyestuffs of the pyrazolone series and to their chromium complex compounds. They correspond in the unmetallized form to the general formula

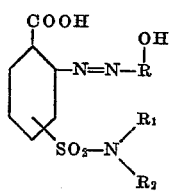

wherein R stands for the radical of a 1-aryl-3-methyl-5-pyrazolone which is free of sulfonic acid and carboxylic acid groups but may be further substituted in the aryl residue as hereinafter specified and which is bound to —N=N— in its 4-position, $R_1$ stands for alkyl, alkoxyalkyl, cycloalkyl, aralkyl or aryl free of sulfonic acid and carboxylic acid groups, and $R_2$ stands for hydrogen or alkyl or, together with —N— and —$R_1$, for a heterocyclic residue, and wherein the group

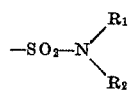

stands in para-position to —COOH or —N=N—.

A preferred series of the new azo dyestuffs correspond in the metal-free form to the formula

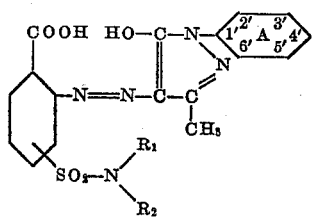

wherein $R_1$ and $R_2$ have the previously-recited significances, wherein the position of the group

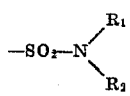

is as afore-recited, and wherein the nucleus A may be monosubstituted in position 3' or 4' or disubstituted in the positions 2', 3' or 2', 4' or 2', 5' or 3', 4' or 3', 5' by halogen atoms, cyano, alkyl and/or alkoxy groups.

The azo dyestuffs according to the invention which are metallized in substance, contain preferably less than two atoms of chromium per two molecules of monoazo dyestuff, for instance one atom of chromium for two molecules of monoazo dyestuff. The latter correspond to the general formulae

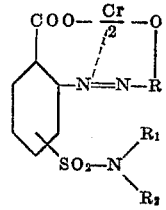

and

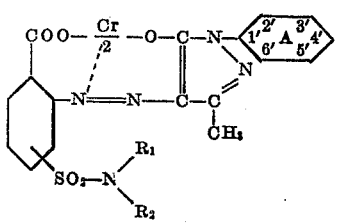

respectively, wherein

has the significance corresponding to the previously-recited

and the significances of the symbols $R_1$, $R_2$ and A are the same as mentioned above. The group

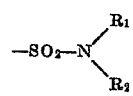

stands in para-position to —COO— or —N=N—.

The new azo dyestuffs of the pyrazolone series of the present invention are obtained by coupling one mole of the diazo compound of a 1-carboxy-2-aminobenzene-sulfonic acid amide which corresponds to the formula

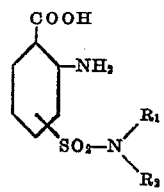

wherein $R_1$ and $R_2$ have the previously-recited significances and the

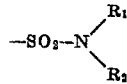

group is in para-position to the carboxyl or to the amino group, with one mol of an unsulfonated and non-carboxylated 1-aryl-3-methyl-5-pyrazolone which may be further substituted as described in the aryl radical, and then treating the so-obtained monoazo dyestuff in substance or on the fiber with a chromium-yielding agent.

The coupling of the diazo compound with the pyrazolone is advantageously carried out in alkaline medium; the working up and isolation of the obtained monoazo dyestuff may be carried out in essentially conventional manner, e. g. by filtering, washing and drying.

Suitable diazo components for the purposes of the present invention are 1-carboxy-2-aminobenzene-4- or -5-sulfonic acid amides, in which one hydrogen atom of the sulfonic acid amide group is replaced by alkyl, alkoxyalkyl, cycloalkyl, or unsulfonated and non-carboxylated aralkyl or aryl—the alkyl being lower alkyl—and the other hydrogen atom of the said sulfonic acid amide group may be replaced by lower alkyl. Moreover, the two hydrogen atoms of the sulfonic acid amide group may be replaced by groups which, with the nitrogen atom, form a heterocyclic group.

The 1-aryl-3-methyl-5-pyrazolones, employed as azo components, are selected from the 1-phenyl-3-methyl-5-pyrazolone and the 1-naphthyl-3-methyl-5-pyrazolone series. Especially suitable are the 1-phenyl-3-methyl-5-pyrazolones which correspond to the formula

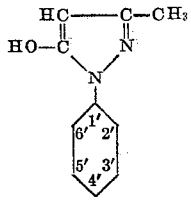

These are advantageously monosubstituted in the 3'- or 4'-position or disubstituted in the 2',3'- or 2',4'- or 2',5'-alkyl and/or lower alkoxy.

Of the 1-naphthyl-3-methyl-5-pyrazolones, the 1-naphthyl(1' and 2')-3-methyl-5-pyrazolones and their derivatives which are partly or entirely hydrogenated in the naphthyl moiety are particularly useful.

For conversion thereof in to the chromium-containing azo dyestuffs, the monoazo compounds are advantageously treated in aqueous solution and at elevated temperature with chromium salts, for example with sodium chromate, potassium chromate, sodium bichromate or potassium bichromate or with complex salts such as sodium chromium tartrate or potassium chromium tartrate or the like. Those metalliferous azo dyestuffs are particularly interesting which contain less than two atoms, for example about one atom, of chromium for two molecules of monoazo dyestuff. Chromium complex compounds of this type are generally designated 1:2-complexes.

The new monoazo dyestuffs are, in non-metallized form, products which are suitable for dyeing wool by the afterchroming process and especially by the single bath chroming process. In this way, level full yellow shades of very good fastness to light, washing and fulling are obtained. The azo dyestuffs which are chromed in substance dye wool and silk from neutral or weakly acid dyebaths in level full yellow shades having very good fastness properties; they are also excellently suited for dyeing synthetic nitrogenous fibers, such as synthetic polyamide fibers, and for dyeing leather.

The following examples set forth presently-preferred illustrative embodiments of the invention which, however, is not at all limited to such embodiments. In the examples, the parts and percentages are by weight, and the temperatures are in degrees centigrade.

*Example 1*

23 parts of 1-carboxy-2-aminobenzene-5-sulfonic acid methylamide are dissolved in 200 parts of water together with 20 parts of an aqueous sodium hydroxide solution of 30% strength. 6.9 parts of sodium nitrite are added to the resultant solution, which is then added dropwise to a mixture of 45 parts of concentrated hydrochloric acid and a small quantity of ice. The temperature of the reaction mass is maintained at 5–10°. The so-obtained diazo solution is allowed to run, at 0–5°, into a cold solution of 19.1 parts of 1-phenyl-3-methyl-5-pyrazolone, 13 parts of 30% aqueous sodium hydroxide solution, 20 parts of sodium carbonate and 300 parts of water. The mass is stirred until the coupling reaction, which immediately ensues, is completed, whereupon the precipitated monoazo dyestuff is filtered off. In the dried state, it is a reddish yellow powder which dissolves with yellow coloration in concentrated sulfuric acid and in dilute aqueous sodium carbonate solution, and dyes wool by the single bath chroming process in yellow shades which are fast to light, washing and fulling. It corresponds to the formula

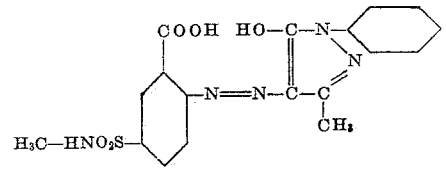

To prepare the chromium complex compound in substance, a portion of the obtained filter cake corresponding to 8.3 of the dried dyestuff is suspended in 230 parts of water. A complex chromium sodium tartrate solution consisting of 10 parts of potassium chromium (III) sulfate, 23 parts of a 13% aqueous tartaric acid solution and 9.3 parts of a 30% aqueous sodium hydroxide solution is added to the suspension, and the mass is boiled for 20 hours under reflux. The precipitated chromium-containing azo dyestuff is filtered off, the filter cake is dissolved in hot dilute aqueous sodium hydroxide solution, the dyestuff precipitated from the solution by the addition of sodium chloride, again filtered off and finally dried at 95° under reduced pressure. It corresponds to the formula

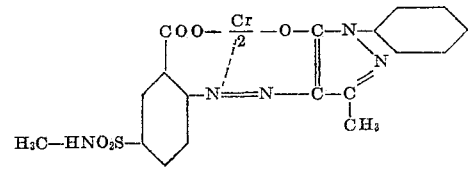

and is a brown-yellow powder, which dyes wool, silk and synthetic polyamide fibers from a weakly acid bath in yellow shades which are fast to light, washing and fulling.

*Example 2*

By replacing the 19.1 parts of 1-phenyl-3-methyl-5-pyrazolone in Example 1 by the equivalent amount of 1-(3'-chloro)-phenyl-3-methyl-5-pyrazolone, and otherwise proceeding as described in the said example, there is obtained a monoazo dyestuff which also dyes wool by the single bath chroming process in shades which are fast to light, washing and fulling. It corresponds to the formula

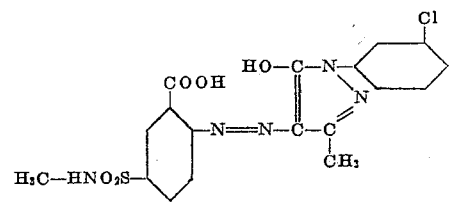

For conversion thereof into the chromium complex compound, 4.5 parts of the dyestuff are dissolved in 250 parts of water at 95–97°, with the addition of sodium hydroxide. To the resultant solution, there is added a solution—which has been adjusted to neutrality with the aid of sodium hydroxide—of 3 parts of crystalline sodium bichromate and 20 parts of water, and the mass is heated to boiling while stirring. The pH is then adjusted to 11.2–11.3 by the addition of acetic acid, and boiling is thereupon continued until the metallization is completed. The chromium-containing azo dyestuff is precipitated by means of sodium chloride, after which it is filtered off and dried at 95° under reduced pressure. It corresponds to the formula

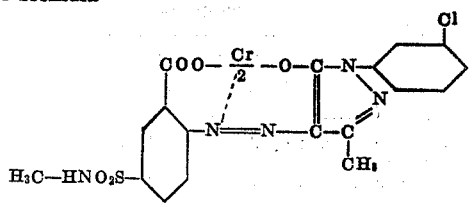

and is a brown-yellow powder which dyes wool, silk and synthetic polyamide fibers from a weakly acid bath in yellow shades which are fast to light, washing and fulling.

*Example 3*

5.7 parts of the monazo compound, obtained after the manner described in Example 1 by coupling diazotized 1-carboxy-2-aminobenzene-5-sulfonic acid morpholide with 1 - (2',4'-dichloro)-phenyl-3-methyl-5-pyrazolone, are dissolved in 200 parts of water at 95° and, after the addition of a solution—neutralized with the aid of sodium hydroxide—of 3 parts of crystalline sodium bichromate and 20 parts of water, the resultant mixture is boiled for 9 hours under reflux. The resultant chromium-containing azo dyestuff is precipitated from the metallization solution by the addition of sodium chloride, after which it is filtered off and dried at 70°. It corresponds to the formula

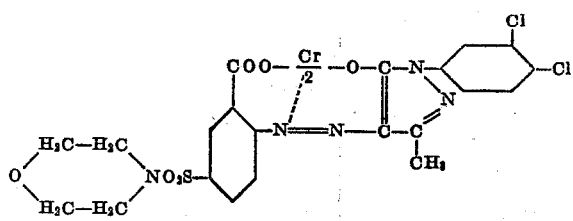

and is a yellow powder which dyes wool, silk and synthetic polyamide fibers from a weakly acid bath in yellow shades which are fast to light, washing and fulling.

*Example 4*

By replacing the 23 parts of 1-carboxy-2-aminobenzene-5-sulfonic acid methylamide in Example 1 by the equivalent quantity of 1-carboxy-2-aminobenzene-5-sulfonic acid-(3'-methoxy)-propylamide, while otherwise proceeding as described in the said example, there is obtained a monoazo dyestuff, the chromium complex compound of which corresponds to the formula

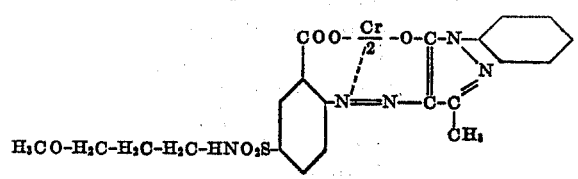

and yields yellow dyeings which are fast to light, washing and fulling.

*Example 5*

29.2 parts of 1 - carboxy-2-aminobenzene-5-sulfonic acid phenylamide are diazotized at 8–12°. The diazo solution is combined with a solution of 19.1 parts of 1-phenyl-3-methyl-5-pyrazolone, 40 parts of sodium carbonate and 200 parts of water. The resultant monoazo dyestuff is precipitated from strongly alkaline medium, filtered off and dried. It corresponds to the formula

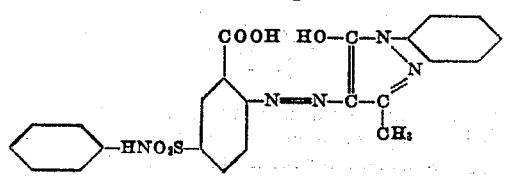

and, in the ground state, is a reddish yellow powder which dyes wool by the afterchroming process or by the single bath chroming process in yellow shades which are fast to light, washing and fulling.

*Example 6*

The cold solution of 23 parts of diazotized 1-carboxy-2-aminobenzene-5-sulfonic acid methylamide is added to a cold solution of 23.5 parts of 1 - naphthyl(1') - 3 - methyl-5-pyrazolone (melting point=170–172°) in 400 parts of water and 40 parts of 30% aqueous sodium hydroxide solution. The mass is stirred at 0–5° until the coupling is completed. After the addition of sodium bicarbonate to the coupling mass, the precipitated monoazo dyestuff is filtered off and then dried at 95° under reduced pressure. A yellow powder is obtained which corresponds to the formula

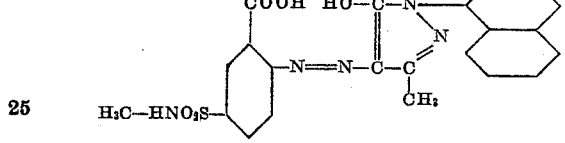

and dissolves with greenish yellow coloration in water and in dilute aqueous sodium hydroxide solution and with yellow coloration in concentrated sulfuric acid, and dyes wool by the single bath chroming process in pure yellow shades which are fast to light, fulling and carbonization.

*Example 7*

In order to convert the monoazo dyestuff obtainable according to Example 6 into the complex chromium compound, 4.7 parts of the said dyestuff in 40 parts of a polyethylene glycol ether are heated together with 1.9 parts of chromium formate to 95–105° for 2½ hours. Thereupon the solution is poured into 100 parts of 5% aqueous sodium chloride solution. The precipitated chromium complex compound is filtered off and suspended in about 100 parts of water at 70°. By the addition of sodium hydroxide, the suspension is rendered alkaline to phenolphthalein, after which the chromium-containing azo dyestuff is filtered off and dried at 80°. It corresponds to the formula

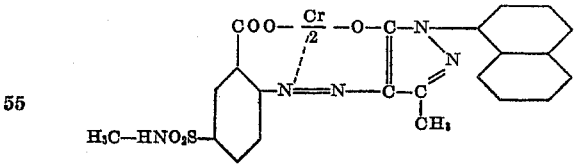

and is a dark yellow powder which dissolves with yellow coloration in dilute aqueous sodium hydroxide solution and with greenish yellow coloration in concentrated sulfuric acid, and dyes wool, silk and synthetic polyamide fibers in pure yellow shades which are fast to light, washing and fulling.

The following table sets forth additional monoazo dyestuffs according to the present invention, which are suitable for use according to the single bath chroming process, and also chromium-containing azo dyestuffs. The dyestuffs can be prepared according to procedures set forth in the foregoing examples. They are characterized in the table by the diazo components (column A) and by the azo components (column B). Column C sets forth their suitability, and columns (D) and (E) indicate the shades of the corresponding dyeings on wool and, in some cases, on synthetic polyamide fiber.

| Example No. | Diazo Component (A) | Azo Component (B) | Suitable as— (C) | Shade on Wool (D) | Shade on Nylon (E) |
|---|---|---|---|---|---|
| 8 | 1-carboxy-2-amino-benzene-5-sulfonic acid-(2'-methoxy)-ethylamide. | 1-phenyl-3-methyl-5-pyrazolone. | Metachrome dyestuff and chromium complex for wool and nylon. | yellow | yellow. |
| 9 | 1-carboxy-2-amino-benzene-4-sulfonic acid methylamide. | do | Chromium complex for wool. | do | do. |
| 10 | 1-carboxy-2-amino-benzene-4-sulfonic acid (3'-methoxy)-propylamide. | do | do | do | do. |
| 11 | 1-carboxy-2-amino-benzene-5-sulfonic acid methylamide. | 1-(3'-cyano)-phenyl-3-methyl-5-pyrazolone. | Metachrome dyestuff and chromium complex for wool and nylon. | do | yellow. |
| 12 | do | 1-(4'-cyano)-phenyl-3-methyl-5-pyrazolone. | do | do | Do. |
| 13 | do | 1-(3'-chloro-4'-cyano)-phenyl-3-methyl-5-pyrazolone. | do | do | Do. |
| 14 | 1-carboxy-2-amino-benzene-5-sulfonic acid naphthyl(1')-amide. | 1-phenyl-3-methyl-5-pyrazolone. | Metachrome dyestuff. | do | |
| 15 | 1-carboxy-2-amino-benzene-5-sulfonic acid benzylamide. | do | do | do | |
| 16 | 1-carboxy-2-amino-benzene-5-sulfonic acid cyclohexylamide. | do | do | do | |
| 17 | 1-carboxy-2-amino-benzene-5-sulfonic acid-(5', 6', 7', 8'-tetrahydro)-naphthyl (1')-amide. | do | do | brownish yellow. | |
| 18 | 1-carboxy-2-amino-benzene-5-sulfonic acid-(3'-methoxy)-propylamide. | 1-(3'-bromo)-phenyl-3-methyl-5-pyrazolone. | Metachrome dyestuff and chromium complex for wool and nylon. | yellow | yellow. |
| 19 | do | 1-(2', 3'-dichloro)-phenyl-3-methyl-5-pyrazolone. | Chromium complex for wool and nylon. | do | Do. |
| 20 | 1-carboxy-2-amino-benzene-5-sulfonic acid-(4'-chloro)-phenylamide. | 1-phenyl-3-methyl-5-pyrazolone. | Metachrome dyestuff. | do | |
| 21 | 1-carboxy-2-amino-benzene-5-sulfonic acid phenylamide. | 1-(3'-chloro)-phenyl-3-methyl-5-pyrazolone. | do | do | |
| 22 | do | 1-(4'-ethyl)-phenyl-3-methyl-5-pyrazolone. | do | do | |
| 23 | 1-carboxy-2-amino-benzene-5-sulfonic acid methylamide. | 1-(5', 6', 7', 8'-tetrahydro)-naphthyl(2')-3 methyl-5-pyrazolone. | Chromium complex for wool and nylon. | do | yellow. |
| 24 | do | 1-(1', 2', 3', 4'-tetrahydro)-naphthyl(2')-3-methyl-5-pyrazolone. | do | do | Do. |
| 25 | 1-carboxy-2-amino-benzene-5-sulfonic acid ethylamide. | 1-decahydronaphthyl(1')-3-methyl-5-pyrazolone. | do | do | Do. |
| 26 | 1-carboxy-2-amino-benzene-5-sulfonic acid methylamide. | 1-naphthyl(2')-3-methyl-5-pyrazolone. | do | do | Do. |
| 27 | do | 1-(4'-methoxy)-phenyl-3-methyl-5-pyrazolone. | do | do | Do. |
| 28 | do | 1-(2', 5'-diethoxy)-phenyl-3-methyl-5-pyrazolone. | do | do | Do. |
| 29 | do | 1-(3', 5'-dimethyl)-phenyl-3-methyl-5-pyrazolone. | do | do | Do. |
| 30 | 1-carboxy-2-amino-benzene-5-sulfonic acid pyrrolidide. | 1-phenyl-3-methyl-5-pyrazolone. | do | do | Do. |
| 31 | 1-carboxy-2-amino-benzene-5-sulfonic acid-(2'-phenyl)-ethylamide. | do | Metachrome dyestuff. | do | |

*Example 32*

A dyebath is prepared from 4000 parts of water, 1 part of the chromable dyestuff obtainable according to Example 5, 1 part of potassium chromate, 7 parts of ammonium sulfate and 10 parts of Glauber's salt, and 100 parts of wool are entered thereinto at 40°. The bath is then heated to boiling in the course of 30 minutes, and maintained at boiling temperature for 90 minutes. The dyed wool is then withdrawn from the bath, washed with water and finally dried.

*Example 33*

100 parts of wool are entered, at 40°, into a dyebath consisting of 1 part of the chromium-containing azo dyestuff obtainable according to Example 1, 4000 parts of water and 5 parts of ammonium sulfate. The bath is heated to boiling in the course of 30 minutes and is then maintained at boiling temperature for 60 minutes. After cooling for a short time, the dyed wool is withdrawn from the bath, washed with water and dried.

Synthetic polyamide fibers are dyed in similar manner, as is also silk, although in the latter case the temperature is maintained somewhat lower, e. g. at 95°.

Having thus disclosed the invention, what is claimed is:

1. An azo dyestuff of the pyrazolone series which corresponds to the formula

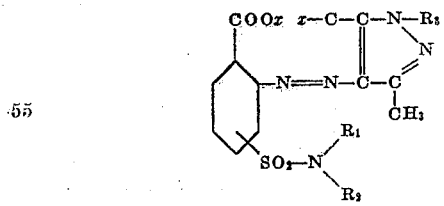

wherein $R_1$ stands for a member selected from the group consisting of lower alkyl, lower alkoxyalkyl, cycloalkyl, aralkyl and aryl groups of the benzene and naphthalene series, free from sulfonic acid and carboxylic acid groups, $R_2$ stands for a member selected from the group consisting of hydrogen, lower alkyl and, together with —N— and —$R_1$, a heterocyclic radical, $R_3$ stands for a member selected from the group consisting of naphthyl, tetrahydronaphthyl, decahydronaphthyl and

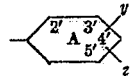

groups, $x$ stands for a member selected from the group consisting of hydrogen and a valence bond to a chromium atom, $y$ and $z$ stand for members selected from the group consisting of hydrogen, chlorine, bromine, cyano, lower alkyl and lower alkoxy, and wherein the

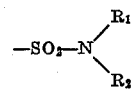

group is in para-position to one of the substituents

—COO—x and —N=N—, and the substituents y and z stand in one of positions 2', 3', 4' and 5' of the benzene nucleus A.

2. The azo dyestuff of the pyrazolone series, which corresponds to the formula

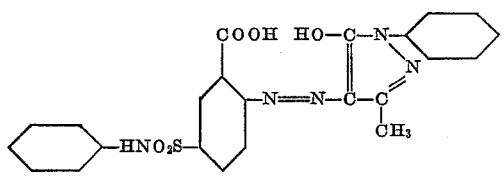

3. The azo dyestuff of the pyrazolone series, which corresponds to the formula

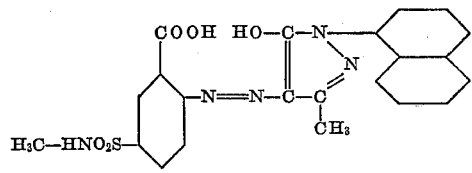

4. The azo dyestuff of the pyrazolone series, which corresponds to the formula

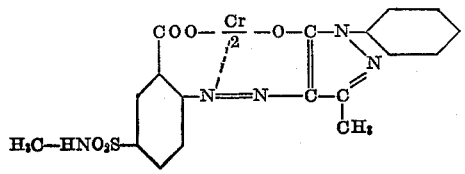

5. The azo dyestuff of the pyrazolone series, which corresponds to the formula

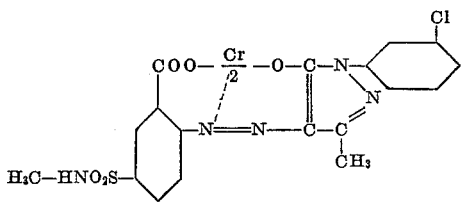

6. The azo dyestuff of the pyrazolone series, which corresponds to the formula

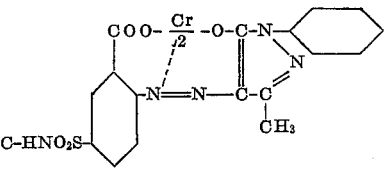

References Cited in the file of this patent
UNITED STATES PATENTS

| | | |
|---|---|---|
| 1,623,005 | Gubler et al. | Mar. 29, 1927 |
| 1,814,218 | Holzach et al. | July 14, 1931 |
| 2,437,645 | Long et al. | Mar. 9, 1948 |
| 2,476,259 | Mayer et al. | July 12, 1949 |
| 2,565,898 | Widmer et al. | Aug. 28, 1951 |
| 2,606,185 | Widmer et al. | Aug. 5, 1952 |
| 2,714,102 | Schetty | July 26, 1955 |

U. S. DEPARTMENT OF COMMERCE
PATENT OFFICE

CERTIFICATE OF CORRECTION

Patent No. 2,821,524     Piero Maderni et al.     January 28, 1958

It is hereby certified that error appears in the printed specification of the above numbered patent requiring correction and that the said Letters Patent should read as corrected below.

Column 3, line 30, after "or 2',5'-" insert -- or 3',4'- or 3',5'- positions by halogen or cyano, lower --; column 4, line 20, after "8.3" insert -- parts --.

Signed and sealed this 17th day of June 1958.

(SEAL)
Attest:
KARL H. AXLINE
Attesting Officer

ROBERT C. WATSON
Commissioner of Patents